(12) United States Patent
Jiang et al.

(10) Patent No.: US 11,906,823 B2
(45) Date of Patent: Feb. 20, 2024

(54) RECONFIGURABLE PORT ARRAYS FOR WAVELENGTH SELECTABLE SWITCH

(71) Applicant: II-VI Delaware, Inc., Wilmington, DE (US)

(72) Inventors: Guomin Jiang, Fremont, CA (US); Helen Chen, Cupertino, CA (US); Haiji J. Yuan, Cupertino, CA (US); Lixin Wang, Fremont, CA (US); WenYi Cao, Shanghai (CN); Xuewen Lu, San Jose, CA (US); Qingyu Li, Cupertino, CA (US); Yimin Ji, Irvine, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 46 days.

(21) Appl. No.: 17/235,168

(22) Filed: Apr. 20, 2021

(65) Prior Publication Data
US 2022/0334416 A1 Oct. 20, 2022

(51) Int. Cl.
*G02F 1/01* (2006.01)
*G02F 1/133* (2006.01)

(52) U.S. Cl.
CPC ........ *G02F 1/0136* (2013.01); *G02F 1/13306* (2013.01); *G02F 2201/18* (2013.01); *G02F 2203/055* (2013.01)

(58) Field of Classification Search
CPC ................ G02F 1/0136; G02F 1/31
See application file for complete search history.

(56) References Cited

U.S. PATENT DOCUMENTS

| | | |
|---|---|---|
| 6,327,019 B1 | 12/2001 | Patel et al. |
| 7,397,980 B2 | 7/2008 | Frisken |
| 8,064,036 B2 | 11/2011 | Yue et al. |
| 8,605,247 B2 | 12/2013 | Yuan et al. |
| 8,923,667 B2 | 12/2014 | Cohen et al. |
| 9,103,991 B2 | 8/2015 | Cohen |

(Continued)

FOREIGN PATENT DOCUMENTS

WO    WO-2010146589 A1 * 12/2010 ............. G02B 6/356

OTHER PUBLICATIONS

Patel, J.S. et al., "Tunable Polarization Diversity Liquid-Crystal Wavelength Filter", IEEE Photonics Technology Letters, vol. 3, No. 8, Aug. 1991, pp. 739-740.

(Continued)

*Primary Examiner* — Jessica M Merlin
(74) *Attorney, Agent, or Firm* — Wendy W. Koba (57) ABSTRACT

A reconfigurable polarization rotator is formed of an array of very small liquid crystal (LC) cells (e.g., cells of less than 10 μm in width, termed "microcells"), referred to hereinafter as "microcells". Each LC microcell is addressable by a separate electrical voltage input that independently controls the polarization rotation performed by the associated LC microcell. By defining a set of adjacent microcells to be held at the same voltage level, that group may be used to form a polarization rotator window of a proper size for a first fiber array configuration. When a fiber array of a different configuration (say, an array with twice the pitch) is used, a different-sized group of adjacent LC microcells is held at a common voltage level so as to form a reconfigured "window" of a new dimension.

15 Claims, 7 Drawing Sheets

(56) References Cited

U.S. PATENT DOCUMENTS

| | | |
|---|---|---|
| 9,158,072 B2 | 10/2015 | Frisken et al. |
| 10,401,570 B2 | 9/2019 | Yang et al. |
| 10,461,878 B2 | 10/2019 | Frisken |
| 10,495,819 B2 | 12/2019 | Wagener et al. |
| 2005/0036202 A1 | 2/2005 | Cohen et al. |
| 2006/0140536 A1* | 6/2006 | Aota ................ G02B 6/29313 385/24 |
| 2008/0316585 A1* | 12/2008 | Cohen ................ H04Q 11/0005 359/301 |
| 2012/0236216 A1* | 9/2012 | Sharma ................ G02B 26/02 349/196 |
| 2014/0104560 A1 | 4/2014 | Suh |
| 2014/0254982 A1* | 9/2014 | Frisken ................ G02B 6/3556 385/17 |
| 2015/0277052 A1 | 10/2015 | Keyworth et al. |

OTHER PUBLICATIONS

Baxter, Glenn, et al., "Highly Programmable Wavelength Selective Switch based on Liquid Crystal on Silicon Switching Elements", Conference Paper, Apr. 2006.

Pinzon, Plinio Jesus, et al., "Reconfigurable 1×2 Wavelength Selective Switch using High Birefringence Nematic Liquid Crystals", Applied Optics, vol. 51, Issue: 25, pp. 5960-5965.

Ren, Hongwen, et al., "Liquid-Crystal-Based Linear Polarization Rotator", Applied Physics Letters 90, (2007), pp. 121123 to 121123-3.

Li, Tenghao, et al., "Electrically Controlled Polarization Rotator Using Nematic Liquid Crystal", vol. 26, No. 24, Nov. 26, 2018, Optics Express, pp. 32317-32323.

Wang, Mi, et al., "LCoS SLM Study and Its Application in Wavelength Selective Switch", Photonics 2017, 4, 22, pp. 1-16.

* cited by examiner

RECONFIGURABLE PORT ARRAYS FOR WAVELENGTH SELECTABLE SWITCH

TECHNICAL FIELD

The present invention relates to the implementation of a wavelength selectable switch (WSS) and, more particularly, to the use of a reconfigurable polarization rotator at the port interface to accommodate connection with fiber arrays of various layouts.

BACKGROUND OF THE INVENTION

Wavelength selective switches are used in a wide variety of optical communication systems and have been found to be a ubiquitous component of reconfigurable optical add/drop multiplexers (ROADMs). As the implementation of a typical WSS has advanced, polarization diversity components have been included at the interface between the input/output ports and the actual switching elements to reduce polarization dependent loss during the switching procedure.

A basic polarization diversity component takes the form of a birefringent walk-off plate used in combination with a polarization rotator (half-wave plate). The walk-off plate creates a spatial separation between orthogonal polarizations of the input signal, with the polarization rotator positioned to intercept one of beams and rotate its polarization by 90°. With both beams now exhibiting the same polarization state, the possibility of polarization dependent loss within the WSS is significantly reduced.

A one-dimensional fiber array is typically used to support the coupling of multiple optical signals with the individual ports of the WSS. While it is possible to use small-sized, individual birefringent walk-off plates and polarization rotators with each port of the WSS, a preferred configuration uses a single, monolithic walk-off plate in combination with a single, monolithic polarization rotator to operate on all beams in parallel. The polarization rotator is formed to have alternating "windows" of 90° rotation and 0° rotation, each pair of windows sized to align with an associated optical fiber of the coupled fiber array. While functional, the fixed size and position of each polarization rotator window dictates the physical dimensions of a fiber array that may be coupled to the WSS. As a result, if there is any subsequent change to the fiber array arrangement (e.g., an array having a different pitch, or an array with a gap between an input port and a set of output ports), an entirely new optical interconnect configuration needs to be created with the modified port spacing/size of the new fiber array.

Depending on the degree of integration in a given assembly, the change in fiber array configuration may entail a re-working of other components in the WSS to accommodate this change.

SUMMARY OF THE INVENTION

The present invention is directed to the implementation of a wavelength selectable switch (WSS) and, more particularly, to the use of a reconfigurable polarization rotator at the port interface to accommodate connection with fiber arrays of various configurations.

A reconfigurable polarization rotator is formed of an array of very small liquid crystal (LC) cells (i.e., cells of less than 10 μm in width and preferably no greater than 8 μm), referred to hereinafter as "microcells". Each LC microcell is addressable by a separate electrical voltage input that independently controls the polarization rotation performed by the associated LC microcell. By defining a set of adjacent microcells to be held at the same voltage level, that group may be used to form a polarization rotator window of a proper size for a given fiber array configuration. When a fiber array of a different configuration is used (say, an array with twice the pitch), a different-sized group of adjacent LC microcells is held at a common voltage level so as to form a reconfigured "window" of a new dimension.

The ability to reconfigure the association between groups of LC microcells with input/output ports of an associated fiber array further allows for a given WSS to be reconfigured for use in different implementations without the need to change out any physical components of the WSS. For example, a "twin" 1×N WSS (typically a paired arrangement of a 1×N WSS with an N×1 WSS) may be reconfigured into a 1×2N WSS by controlling the grouping of individual LC microcells in the formation of the associated polarization rotator windows.

An exemplary embodiment may take the form of a reconfigurable port interface for given WSS having a plurality of optical signal coupling ports, at least one port for receiving an optical input signal and at least one port for transmitting an optical output signal. The port interface itself is formed to include a birefringent walk-off plate and a polarization rotator array with individually addressable LC cells. The birefringent walk-off plate is disposed adjacent to the plurality of optical signal coupling ports, the birefringent walk-off plate performing spatial separation of orthogonal polarizations of the optical input signal and spatial recombination of parallel polarizations of the optical output signal. The polarization rotator array is positioned to intercept optical signals exiting and entering the birefringent walk-off plate and includes a plurality of LC microcells, each individual LC microcell separately addressable by a control voltage input to provide one of 90° polarization rotation via a first applied voltage, and 0° polarization rotation via a second applied voltage. A plurality of control electrodes is coupled to the plurality of LC microcells in a one-to-one relationship, wherein first selected groups of adjacent LC microcells are held at the first applied voltage to create a 90° polarization window and second selected groups of adjacent LC microcells are held at the second applied voltage to create a 0° polarization window.

Another embodiment may be defined as a reconfigurable polarization rotator array comprising a plurality of LC microcells (each individual LC microcell separately addressable by a control voltage input to provide one of 90° polarization rotation and 0° polarization rotation, the plurality of LC microcells all exhibiting a same width W less than ten microns), a plurality of control electrodes coupled to the plurality of LC microcells in a one-to-one relationship, and a window configuration controller coupled to the plurality of control electrodes and responsive to window reconfiguration commands to apply appropriate voltages to each control electrode of the plurality of control electrodes to define selected groups of adjacent microcells to form a transmission window and provide a predetermined polarization rotation to an optical beam passing through the transmission window.

Yet another embodiment of the present invention relates to the capability to reconfiguration the application of a given WSS (e.g., as a 1×N WSS, a "twin" pair of 1×(N/2) WSS, a "quad" set of 1×(N/4)) by controlling the voltages applied to each individual LC microcell to define the properties of each individual port.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
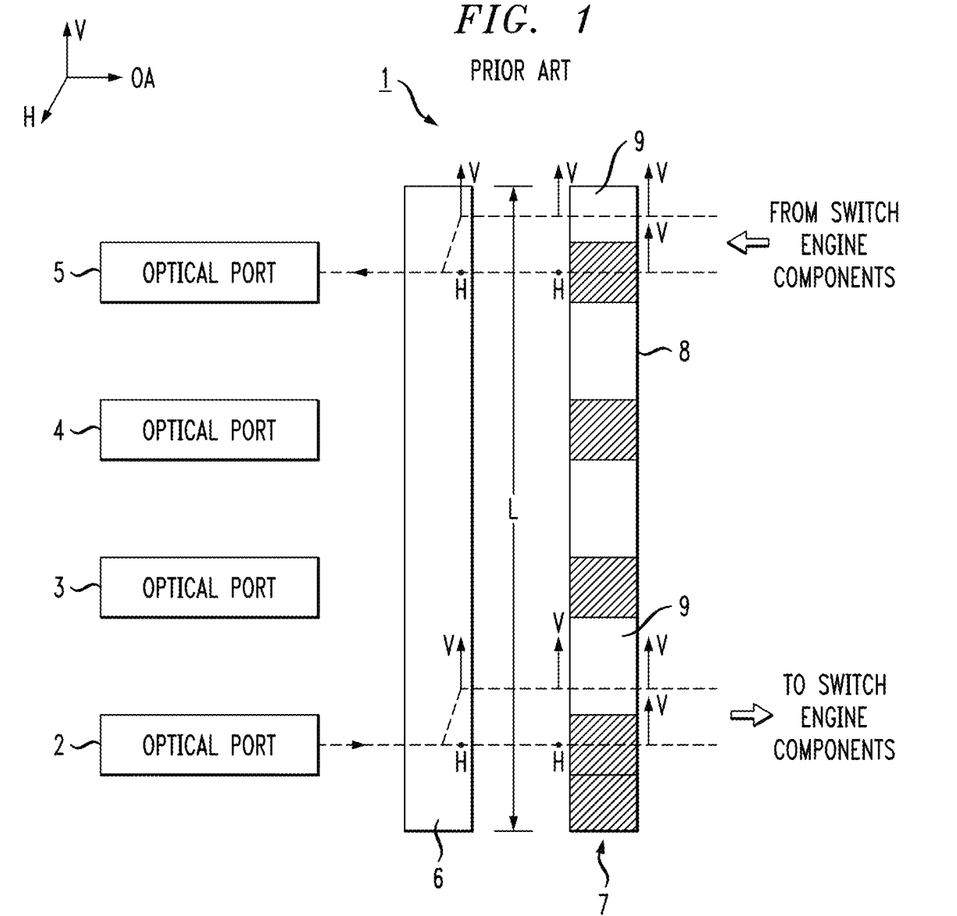
FIG. 1 is a side view of a prior art WSS, illustrating the use of polarization diversity for reduced polarization-dependent loss within the switching functions.

FIG. 1 is a simplified cross-sectional view of a prior art optical coupling interface 1 formed to utilize polarization diversity to address problems associated with polarization-dependent loss within a wavelength selective switch (WSS) module. The presence of uncontrolled polarization of a propagating free space optical beam may result in optical loss that occurs as the beam propagates through the switch fabric between a given input port and a defined output port. Polarization diversity refers to splitting/recombining of orthogonal polarization states of an input beam so that a beam of single, controlled polarization propagates through the switch. By applying polarization diversity to create single beam of a fixed polarization state, the WSS may use polarization-sensitive components and yet provide a switch that exhibits very little polarization-dependent loss.

Optical coupling interface 1 includes a set of four optical ports (denoted 2, 3, 4, and 5 in FIG. 1), as would be used with a 1×3 WSS (either a set of three input ports and one output port, or a single input port and a set of three output ports). Optical coupling interface 1 includes a birefringent walk-off plate 6 and a polarization rotator 7 (at times, the polarization rotator is referred to as a "half-wave plate", since it functions rotate by 90° the polarization of beam propagating through the plate). Birefringent walk-off plate 6 is a reciprocal device and functions to spatially separate an incoming light beam into a pair of orthogonally-polarized sub-beams (shown as vertical (V) and horizontal (H) polarized sub-beams in FIG. 1), as the beam propagates from the left to the right in the view of FIG. 1. In accordance with its reciprocal properties, birefringent walk-off plate 6 functions to re-combine (i.e., spatially overlap) a pair of spatially separate sub-beams (of V and H polarization) to form a single output beam having both V and H polarization components (shown in FIG. 1 as a pair of polarized beams propagating from right to left). Polarization rotator 7 is disposed adjacent to birefringent walk-off plate 6 and is positioned to align with the sub-beams of one of the polarization states. Polarization rotator 7 functions in a manner well-known in the art to rotate the polarization state of the sub-beam passing through its thickness (e.g., from "H" to "V"), thus providing a "single polarization" input to the following switch engine components of the WSS.

Figure 2:
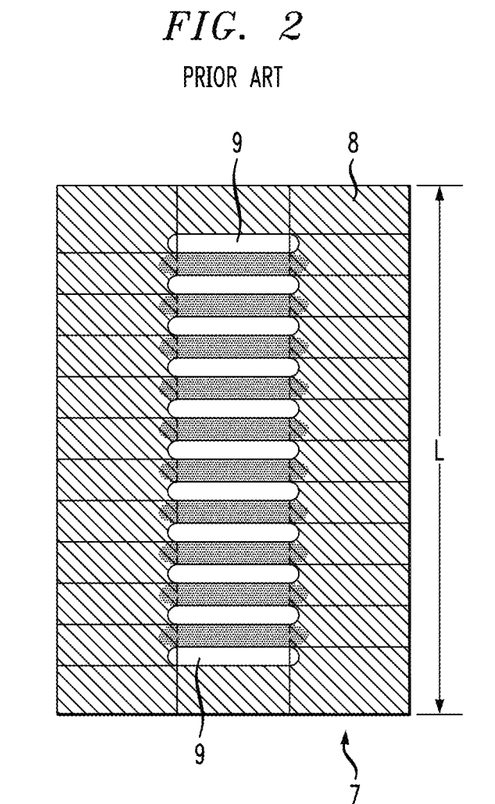
FIG. 2 is a front view of an exemplary prior art quartz plate used as a polarization rotator in a prior art WSS.

In many arrangements, polarization rotator 7 is formed of a quartz plate with a thickness that will create a 90° polarization rotation of a propagating beam. In a multi-port arrangement such as that shown in FIG. 1, a monolithic (single) quartz plate of a length L sufficient to interact with each port may be used. FIG. 2 is a front view of an exemplary quartz embodiment of prior art polarization rotator 7. As shown, a single piece of quartz 8 is used to form the monolithic structure, with a plurality of openings 9 created through the thickness of quartz 8. Openings 9 are used to allow for sub-beams of a first polarization state (say, "vertical") to pass through unimpeded, while rotating the orthogonally-polarized ("horizontal") sub-beams through 90° such that both sub-beams are of the same polarization upon entering the various switch engine components (not shown) within the WSS.

Openings 9 in quartz material 8 are typically created by using a mechanical cutting process, which has unfortunately been found to induce unwanted cracking in surrounding portions of the quartz crystal structure. Moreover, a mechanical cutting process is limited in terms of being able to reliably create openings of a relatively small size (e.g., less than about 10 μm). The spacing between adjacent openings may also be somewhat variable, lead to problems when attempting to align the windows with an associated fiber array. An alternative to the use of a monolithic crystal with machined openings is to use multiple, small-sized quartz plates, each quartz plate positioned and aligned to intercept a single beam (a rather labor-intensive approach that is subject to misalignment and other fabrication difficulties).

Figure 3:
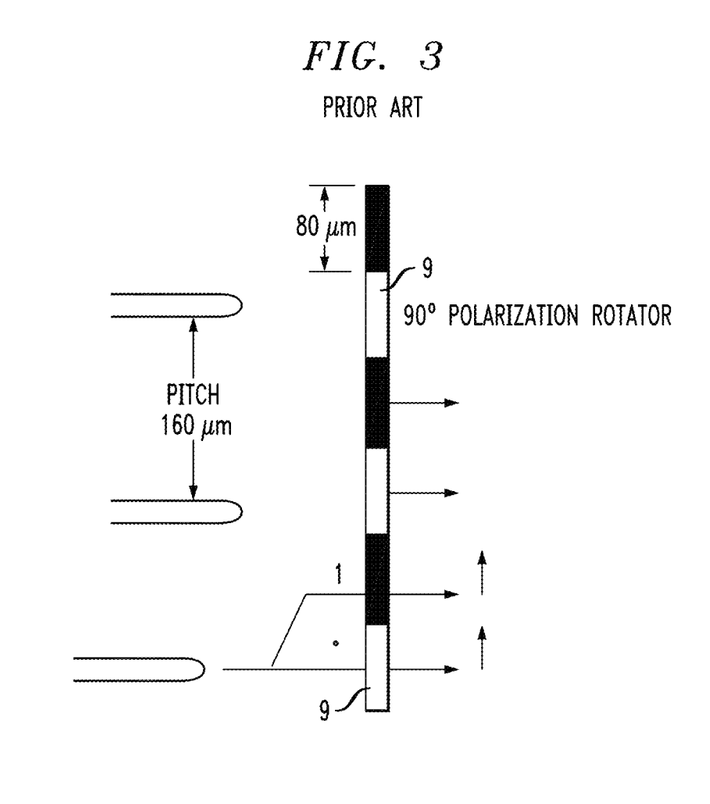
FIG. 3 illustrates a prior art array of liquid crystal (LC) cells of fixed rotation that may be used as a polarization rotator in a prior art WSS.

Instead of using a quartz-based polarization rotator, a liquid crystal (LC) array may be used as a polarization rotator array. A pair of LC cells is associated with each port, with a separate electrical bias applied to each cell and used to provide either a 90° polarization rotation or a 0° polarization rotation to the sub-beam passing through the associated cell. An array of LC cells is shown in FIG. 3 (in side view). Each cell in this prior art configuration is also referred to as a "window", with each sub-beam passing through its own window. The process of fabricating an LC array allows for relatively small windows to be formed, with greater accuracy than possible with a machined quartz plate. These improvements allow for accurate alignment with the signal ports. However, the fixed window size inherent in the prior art LC-based polarization rotator has been found to constrain the number of ports that may be used, as well as the spacing (pitch) between adjacent ports. The physical limitations on the LC window size thus requires that a new interface to be created for each different fiber array design that is developed. In most cases, as changes are made in the fiber array layout, a completely new WSS needs to be fabricated to accommodate the changes in input/output beam location.

A reconfigurable optical interface between various fiber array layouts and a WSS formed in accordance with the principles of the present invention is proposed to address these problems. In particular, FIG. 4 illustrates an exemplary reconfigurable optical coupling interface arrangement 10 formed in accordance with the present invention and based upon the implementation of a reconfigurable LC polarization rotator array 12 that permits for interfacing with a variety of different port configurations.

For the sake of discussion, arrangement 10 is shown as having the same 1×3 port arrangement as that shown in the prior art illustration of FIG. 1. Here, the ports include a single input port 16 and a set of three output ports 18-1, 18-2, 18-3. A birefringent walk-off plate 20 is used in the same manner as discussed above to provide a controlled spatial separation between the orthogonal polarizations of the propagating sub-beams in optical coupling interface arrangement 10. A spacing P (often referred to herein and elsewhere as "pitch") is defined as the separation between adjacent beams entering/exiting adjacent ports.

Figure 5:
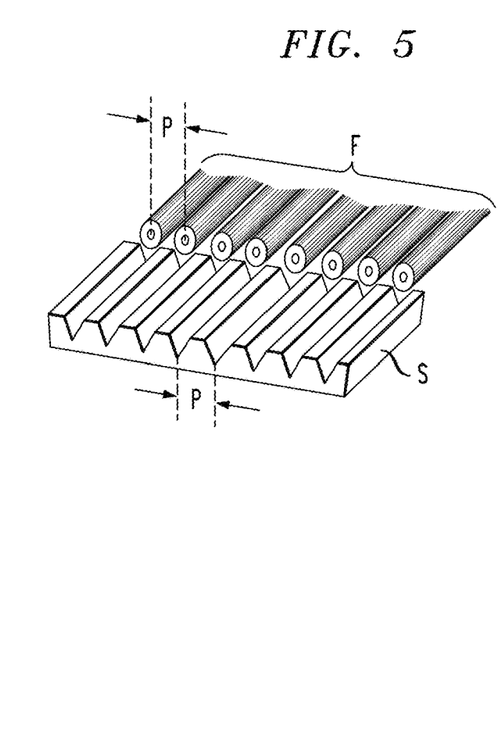
FIG. 5 is a diagram illustrating the definition of "pitch" as used to define core-to-core spacing between adjacent optical fibers, as well as center-to-center spacing between adjacent ports of a WSS.

FIG. 5 illustrates how the pitch of an associated fiber array is defined and used to define the pitch of the optical ports that are coupled to the individual fibers in the array. Here, a plurality of fibers F are positioned in V grooves formed in a support plate S. The core regions of each fiber are shown, with the pitch P defined as the spacing between adjacent core regions. Depending on the physical formation of the V-grooves (or similar fiber support configurations), the pitch P may be different, depending on the type of fiber, size of the core region, fiber diameter, and the like.

Figure 4:
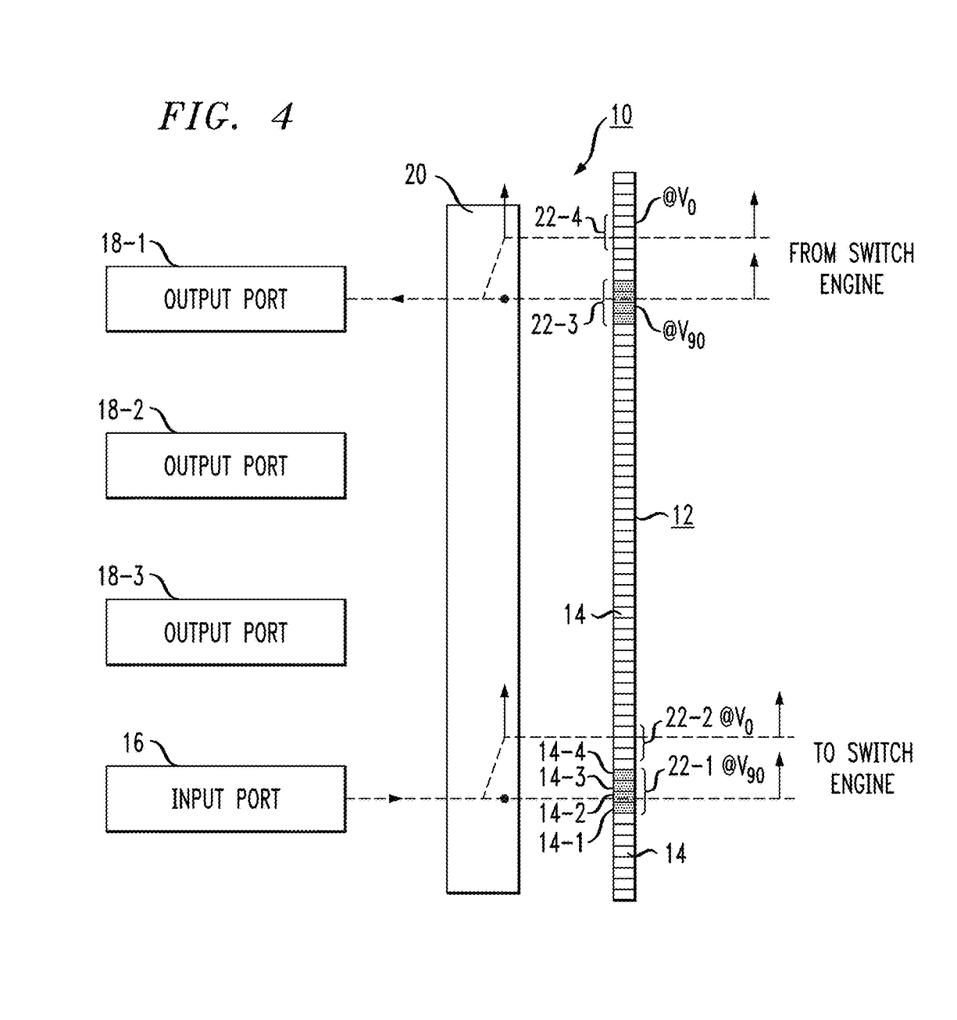
FIG. 4 illustrates an exemplary reconfigurable optical coupling interface arrangement formed in accordance with the present invention to provide coupling between various input/output port arrangements and the switching components of a given WSS, forming a 1×3 WSS.

Continuing with the discussion of the exemplary embodiment of the present invention as shown in FIG. 4, reconfigurable LC polarization rotator array 12 is formed of a plurality of very small (narrow) LC cells (for example, on the order of 5-8 μm; perhaps even smaller), referred to hereafter as LC "microcells". Each LC microcell 14 is separately addressable (and thus reconfigurable between providing either a 90° polarization rotation or a 0° polarization rotation) by an array of applied voltages in a one-to-one manner. Therefore, groups of adjacent microcells may be held at the same voltage potential to form a single "window" for rotating (or passing) an optical beam passing through the defined group of LC microcells.

In the exemplary embodiment of FIG. 4, a group of four LC microcells 14-1, 14-2, 14-3, and 14-4 is held at a first voltage (denoted $V_{90}$) that provides 90° polarization rotation for a sub-beam propagating through the collection of microcells. This group is defined as a first polarization rotator window 22-1 and is used to rotate the polarization of a walked-off beam from input port 16. A second window 22-2 is also associated with input port 16, and is similarly defined by a group of four individual LC microcells 14, where this group of microcells is held at a second voltage (denoted $V_0$) that is associated with 0° polarization rotation so that the polarized sub-beam continues to propagate along the original polarization axis (i.e., no rotation). It is to be understood that the group of four microcells as shown in FIG. 4 is for illustrative purposes only; in practice, a larger number of such microcells (e.g., 10 or more) may be grouped together to define a proper-sized window.

In the illustrative example of FIG. 4, the associated switch engine components with the WSS are presumed to be configured so that the incoming beam from input port 16 is directed to output port 18-1. A first output window 22-3 (again, formed of a group of four individual LC microcells) is defined as associated with output port 18-1, with the group of LC microcells all held at a voltage $V_{90}$ that provides a 90° polarization rotation to rotate one of the sub-beams applied as an input thereto. An adjacent group of four LC microcells is grouped together to define a second output window 22-4 (with this group held at a proper voltage $V_0$ to provide 0° polarization rotation). Subsequent to the rotation performed by first output window 22-3, the pair of spatially separate orthogonal sub-beams pass through birefringent walk-off plate 20, which functions in this direction to spatially re-combine the two polarizations/sub-beams and direct the combination as the output beam into output port 18-1. Although not specifically enumerated, it is to be understood that a pair of output windows is also created for each of the remaining output ports 18-2 and 18-3.

Figure 6:
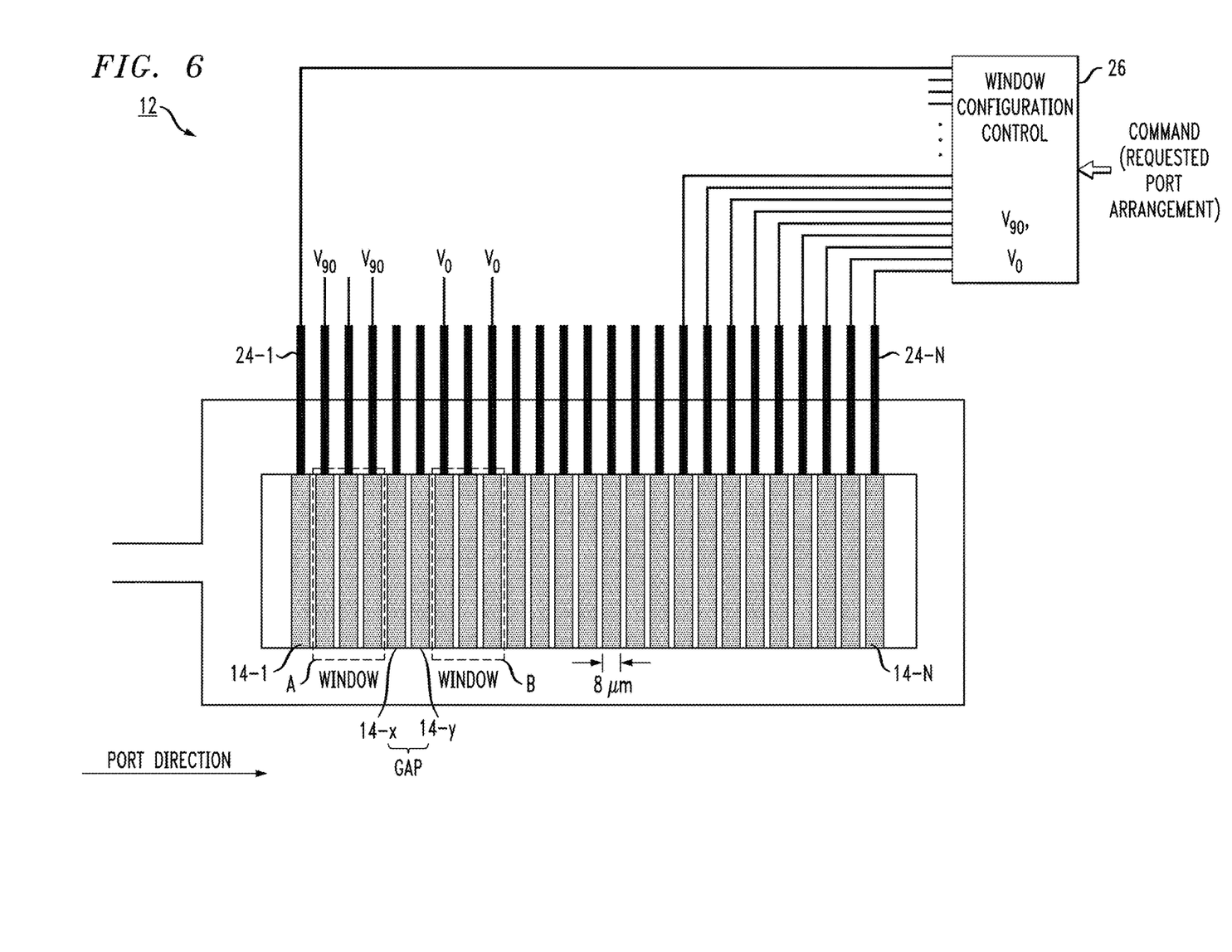
FIG. 6 is a detailed depiction of a reconfigurable LC polarization rotator array, formed of a large number of small-sized LC microcells (microcells being perhaps 5-8 μm in width)

FIG. 6 is a somewhat more detailed depiction of reconfigurable LC polarization rotator array 12, showing a plurality LC microcells 14 (where each microcell may be about 5-8 μm in width). A plurality of electrodes 24, associated with LC microcells 14 in a one-to-one relationship, is also shown in FIG. 6. In particular, each electrode 24-i provides a specific bias voltage to its associated LC microcell 14-i, as controlled by a window configuration controller 26. A "command" input to controller 26 defines a specific port arrangement that is to be created, including the number of individual ports, the spacing (pitch) between adjacent ports, window size (including, perhaps, the number of individual LC microcells 14 to be grouped together to form the window), gaps to be positioned between ports, and the like. It is to be understood that the use of a separate element as a window configuration controller is exemplary only and that any technique for applying the proper voltages to the individual LC microcells may be used.

A dotted outline A is shown in FIG. 6 as grouping together a first set of LC microcells 14 to form a first window, with a dotted outline "B" shown as grouping together a second set of LC microcells 14 to form a second window. A gap between these two windows is shown here as formed by a pair of LC microcells (14-x, 14-y) that are not energized. In this case, window configuration controller 26 functions to send a first bias voltage $V_{90}$ used to create 90° polarization rotation to the LC microcells 14 forming window A. The LC microcells 14 of window B (associated with 0° polarization rotation) are similarly controlled by window configuration controller 26, where in this case window configuration controller 26 provides a second bias voltage $V_0$ to the set of LC microcells 14 forming window B. Inasmuch as each individual, small-sized LC microcell 14 is individually controllable, the window size, port configuration, port pitch, etc. may all be adjusted via window configuration controller 26 (or any other suitable arrangement for addressing individual LC microcells), as necessary to be used with a variety of different fiber array configurations.

Figure 7:
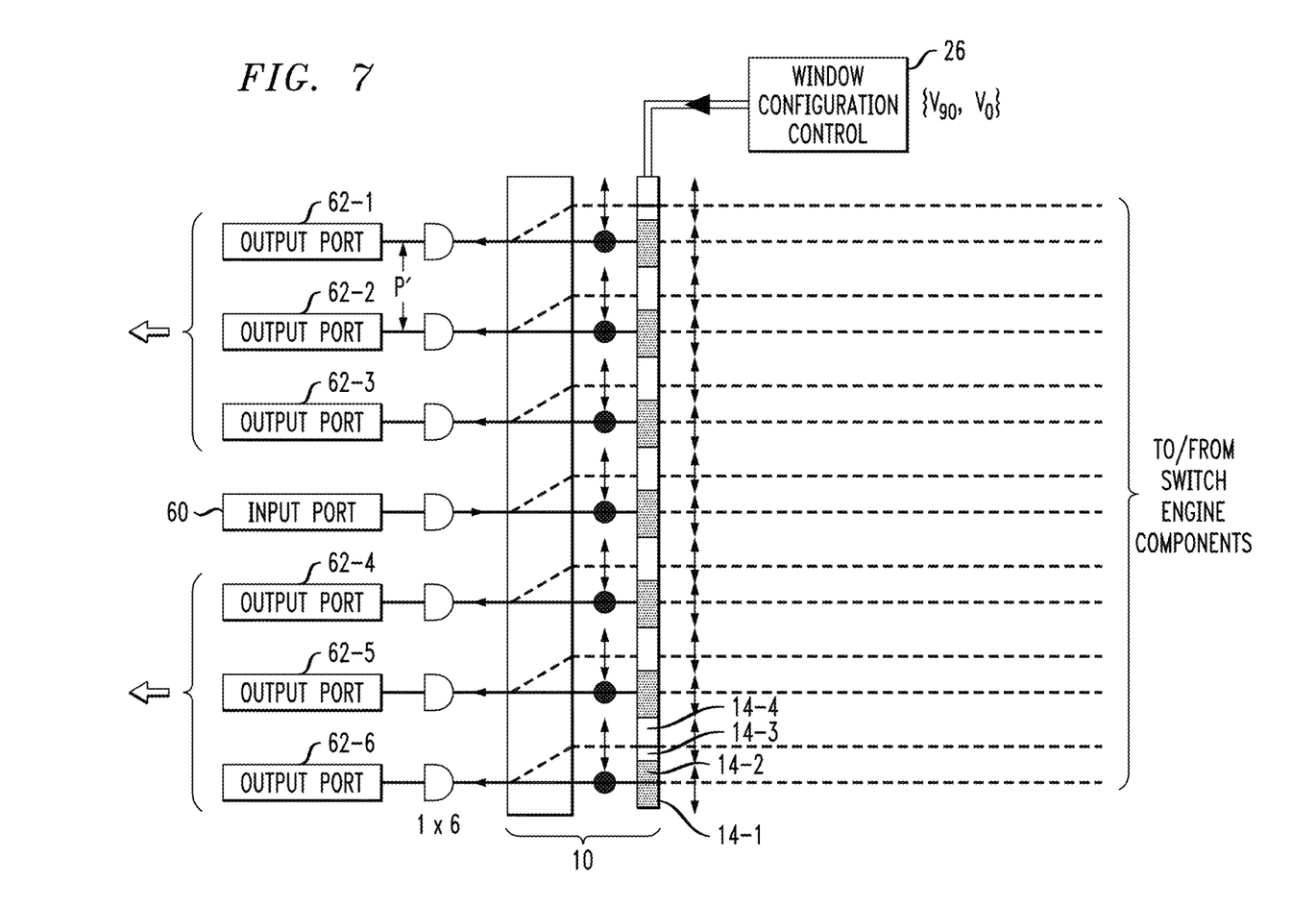
FIG. 7 shows a reconfiguration of the arrangement of FIG. 4 as providing an interface for a 1×6 WSS, based upon controlling the voltages applied to the reconfigurable LC polarization rotator array.

FIG. 7 illustrates one possible reconfiguration of LC microcells 14 within polarization rotator array 12 that allows for a different number of ports, performing a different function, to utilize the same optical coupling interface arrangement 10 as discussed above in association with the 1×3 configuration of FIG. 4. Here, a 1×6 WSS is able to utilize arrangement 10 by changing the grouping of LC microcells 14 to adjust to the different (smaller) pitch (shown here as P') as well as the different number of ports interacting with rest of the system. In the arrangement of FIG. 7, a single input port 60 is defined as the center-most port, with two sets of output ports (62-1 through 62-3, and 62-4 through 62-6) positioned above and below input port 60, respectively. This is a common arrangement used in many WSS implementations to minimize the beam steering angle required to properly couple the input port to the selected output port. Advantageously, the reconfiguration capability of the LC microcell array of the present invention allows for the change between the 1×3 WSS arrangement of FIG. 4 and the 1×6 WSS arrangement of FIG. 7 to be implemented quickly and easily, without the need to change any of the physical components.

For this particular embodiment, reconfigurable polarization rotator array 12 is controlled (via window configuration controller 26) so that only a pair of adjacent LC microcells 14 is grouped together to form a window (in contrast to the grouping of four adjacent LC microcells 14 in the arrangement of FIG. 4). By simply adjusting the individual voltages provided to each LC microcell 14-$i$, the port interface is easily adjusted to accommodate a different fiber array (here, seven fibers as compared to four fibers), with a different pitch between adjacent fibers. Clearly, this is just one possible reconfiguration; any grouping of adjacent LC microcells 14 may be used to allow for a given set of ports to be aligned with the signal paths.

Figure 8:
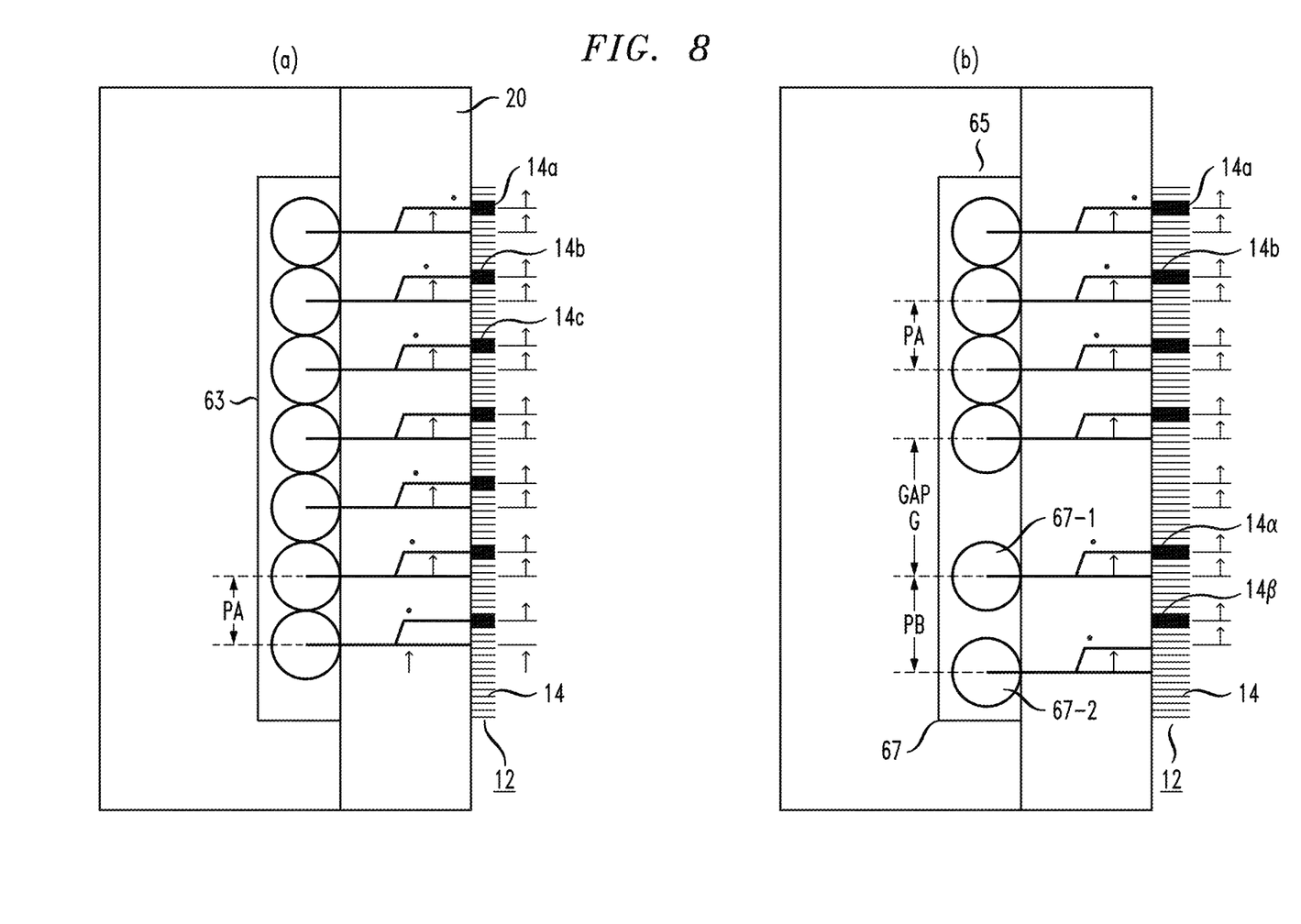
FIG. 8 illustrates the use of the inventive reconfigurable LC polarization rotator array to adjust a spacing (gap) between defined ports, as well as providing an arrangement with two different pitches, where FIG. 8(*a*) shows a 1×6 WSS port arrangement and FIG. 8(*b*) shows a combination of a 1×3 WSS port arrangement and a pair of spaced-apart ports (perhaps used for communicating monitoring signals)

FIG. 8 illustrates another advantage of utilizing a reconfigurable polarization rotator formed of an array of LC microcells in accordance with the principles of the present invention. In this example, the ability to address individual LC microcells 14 allows for the same WSS switch engine components (not shown) to communicate with two different fiber arrays, configured for different purposes. FIG. 8(a) illustrates a first port configuration 63, comprising a 1×6 arrangement of ports with an identical pitch PA between each port. In this case, an appropriate set of LC microcells 14 are controlled to provide 90° polarization rotation, where the sets are spaced by an amount that provides alignment with the pitch PA of port configuration 63.

FIG. 8(b) illustrates a different port configuration, which in this case comprises a first set of ports 65 that are used as input and output ports for a 1×3 WSS. A second set of ports 67 include a pair of ports 67-1, 67-2 that may be spaced apart to improve certain characteristics of the optical performance of the switch (e.g., reduced crosstalk between adjacent ports, reduced polarization dependent loss, and the like), incorporate a pair of ports for transmit/receive switch monitoring information, or various other possibilities. In this arrangement, the 1×3 WSS is shown as having the same pitch PA as that of configuration 63 of FIG. 8(a). A gap G is shown in the spacing between ports 65 and 67, with a second pitch PB defined between port 67-1 and port 67-2. This reconfiguration is easily provided in accordance with the present invention by identifying different sets of individual LC microcells 14 that are required to align with ports 67. Obviously, this is only one example; the ability to separately address each LC microcell provides for great flexibility in accommodating fiber arrays of different configurations.

Figure 9:
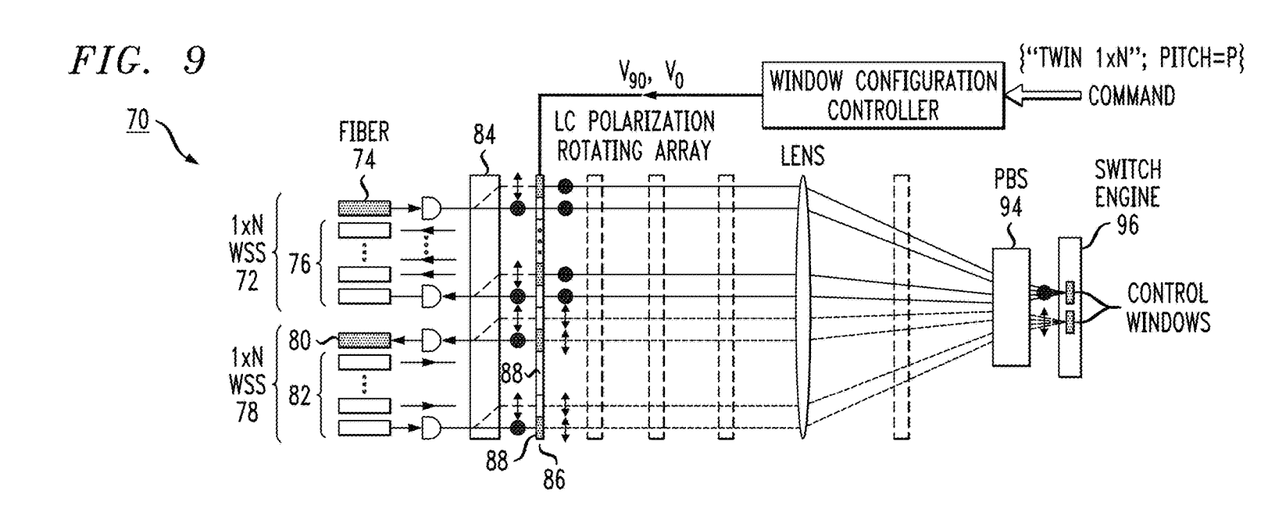
FIG. 9 illustrates a twin 1×N WSS including a reconfigurable LC polarization rotator array of the present invention.
Figure 10:
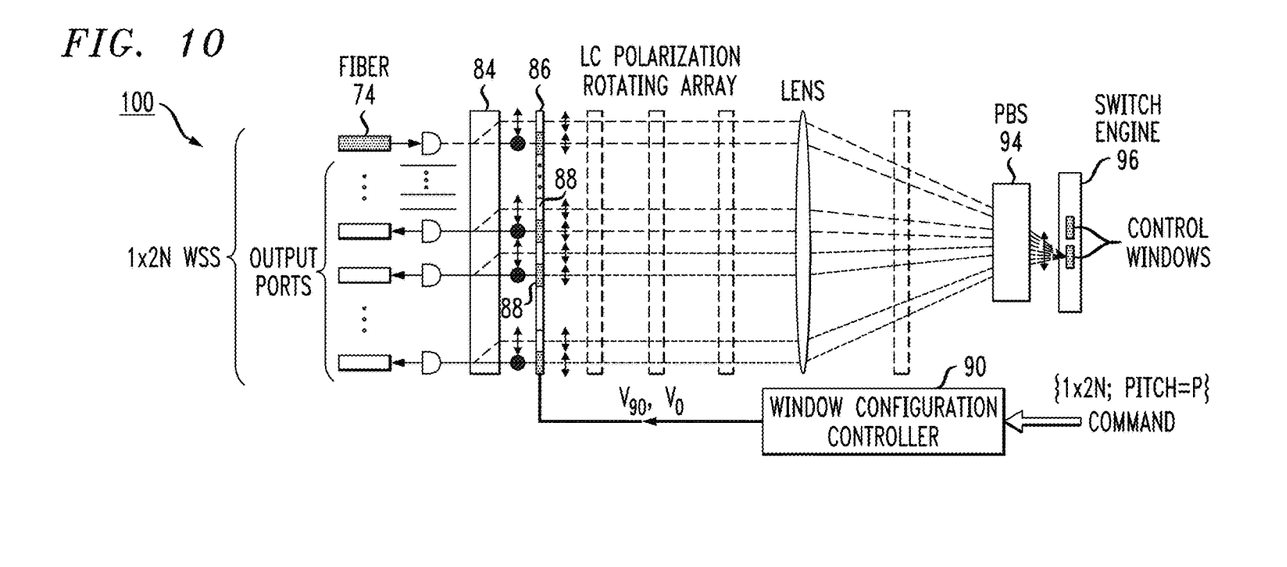
FIG. 10 illustrates a 1×2N WSS, based upon the same components as FIG. 9, with the LC polarization rotator array reconfigured in accordance with the principles of the present invention.

Advantageously, a reconfigurable LC microcell polarization rotator array formed in accordance with the present invention may also be used to "reconfigure" an application of a given WSS. For example, control of a reconfigurable polarization rotator array allows for a "twin" 1×N WSS to be re-purposed as a 1×2N WSS. FIGS. 9 and 10 illustrate how this reconfiguration takes place.

FIG. 9 illustrates a twin 1×N WSS 70, which is so named because two separate signal sources use the same switching hardware at the same time by using signals propagating along orthogonal axes (each source maintaining a defined polarization). Here, a 1×N port arrangement 72, comprising a single input port 74 and a plurality of N output ports 76, is configured to maintain an "H" polarization state. A companion N×1 port arrangement 78 completes the twin arrangement, operating along the orthogonal "V" polarization state, arrangement 78 shown as comprising a single output port 80 and a plurality of N input ports 82. A single birefringent walk-off plate 84 is shown as positioned beyond the twin configuration of 1×N port arrangement 72 and N×1 port arrangement 78. Walk-off plate 84 is used in the manner described above to provide the spatial separation between the two polarization states of the propagating optical sub-beams.

A reconfigurable LC polarization rotator array 86 (formed of a large number of individual, small-sized LC microcells 88) is shown as positioned adjacent to birefringent walk-off plate 84. A window configuration controller 90 is used to supply the individual voltages ($V_{90}$ or $V_0$, as the case may be) to each LC microcell 88 in a manner that sizes and aligns the polarization windows for each port. The ability to utilize the same WSS elements (such as, for example, polarization beam splitter 94 and switch engine 96) in a twin 1×N arises from applying "polarization diversity" to the arrangement. That is, the 1×N WSS 72 is configured to utilize beams propagating in a first polarization direction (here, defined as "horizontal") and the N×1 WSS 78 is configured to utilize beams propagating in a second, orthogonal polarization direction (here, defined as "vertical"). By maintaining orthogonality between the free-space beams associated with each WSS, the two separate arrangements may share the same switching elements.

In accordance with the principles of the present invention, reconfigurable LC polarization rotator array 86 is controlled to provide the desired polarization diversity. By addressing each individual LC microcell 88 with a proper voltage level, it is possible to use a single walk-off plate and single polarization rotator array to achieve polarization diversity.

FIG. 10 illustrates a 1×2N WSS 100 that is formed by the same components as used to form the twin 1×N WSS of FIG. 9. Here, first port 74 is defined as the single input port, with the remaining ports (2N, or 2N+1) used as output ports. To achieve this reconfiguration, window configuration controller 90 modifies the voltages applied to LC microcells 88 such that adjacent windows (of the same size as used for the "twin" arrangement) are of alternating polarization. In this "reconfiguration", therefore, a single polarization state is used within the WSS, and the number of possible output ports associated with a given input port is doubled (when compared to the configuration of FIG. 9).

As shown in both FIGS. 9 and 10, an external "command" input may be used to instruct controller 90 with respect to the particular input/output port arrangement, as desired. In accordance with the principles of the present invention, each individual LC microcell 88 is separately addressable and the command to controller 90 is used to determine the particular LC microcells that are to be energized, and the specific voltage ($V_{90}$ or $V_0$) that is to be applied.

The principles of the present invention as discussed above in terms of reconfiguring a twin 1×N WSS into a 1×2N WSS may also be used to reconfigure a twin 1×N WSS into a "quad" arrangement of 1×(N/2) WSS.

It is appreciated by persons skilled in the art that the present invention is not limited by what has been particularly shown and described hereinabove. Rather, the scope of the present invention includes both combinations and subcombinations of various features described hereinabove, as well as variations thereof and modifications thereto that would occur to a person of skill in the art upon reading the above description and which are not in the prior art.

What is claimed is:

1. A reconfigurable port interface for a wavelength selectable switch (WSS), comprising:
   a plurality of optical signal coupling ports, at least one port for receiving an optical input signal and at least one port for transmitting an optical output signal;
   a birefringent walk-off plate disposed adjacent to the plurality of optical signal coupling ports, the birefringent walk-off plate performing spatial separation of orthogonal polarizations of the optical input signal and spatial recombination of parallel polarizations of the optical output signal; and
   a polarization rotator array positioned to intercept optical signals exiting and entering the birefringent walk-off plate, the polarization rotator array including
      a plurality of liquid crystal (LC) microcells, each individual LC microcell separately addressable by a control voltage input to provide one of 90° polarization rotation via a first applied voltage, and 0° polarization rotation via a second applied voltage; and
      a plurality of control electrodes coupled to the plurality of LC microcells in a one-to-one relationship, wherein first selected groups of adjacent LC microcells are held at the first applied voltage to configure a 90° polarization window and second selected groups of adjacent LC microcells are held at the second applied voltage to configure a 0° polarization window, defining a specific port arrangement of the WSS, the number of individual LC microcells forming the first and second groups selected to define a window size for the defined specific port arrangement.

2. The reconfigurable port interface of claim 1, wherein a first group of adjacent LC microcells is controlled to exhibit 90° polarization rotation, forming a first window of a defined size and location for accommodating a first sub-beam of a propagating input or output signal and a second group of adjacent LC microcells, in proximity to the first group, controlled to exhibit 0° polarization to form a second window of the defined size for accommodating a second sub-beam of the propagating input or output signal.

3. The reconfigurable port interface as defined in claim 1, wherein the interface further comprises
   a window configuration controller coupled to the plurality of control electrodes and responsive to window reconfiguration commands to determine the identity of individual LC microcells required to provide either of 90° polarization rotation and 0° polarization rotation for configuring the specific port arrangement of the WSS for a given arrangement of the plurality of optical signal coupling ports.

4. The reconfigurable port interface of claim 3, wherein the polarization rotator array is configured to associate a pair of transmission windows with each optical coupling port, the pair of transmission windows comprising a first transmission window formed by a first group of adjacent LC microcells controlled to exhibit 90° polarization rotation and a second transmission window formed by a second group of adjacent LC microcells controlled to exhibit 0° polarization rotation.

5. The reconfigurable port interface of claim 3, wherein the window reconfiguration commands for defining a specific port arrangement of the WSS include parameters selected from the group consisting of: port array size, port pitch, gap spacing between selected ports.

6. The reconfigurable port interface of claim 1, wherein each LC microcell has a same width W, where W is less than ten microns.

7. The reconfigurable port interface of claim 6, wherein the LC microcell width W is in the range of 5-8 microns.

8. A reconfigurable polarization rotator array comprising:
   a plurality of liquid crystal (LC) microcells, each individual LC microcell separately addressable by a control voltage input to provide one of 90° polarization rotation and 0° polarization rotation, the plurality of LC microcells all exhibiting a same width W less than ten microns;
   a plurality of control electrodes coupled to the plurality of LC microcells in a one-to-one relationship; and
   a window configuration controller coupled to the plurality of control electrodes and responsive to window reconfiguration commands to apply appropriate voltages to each control electrode of the plurality of control electrodes to define selected groups of adjacent microcells to form a transmission window and provide a predetermined polarization rotation to an optical beam passing through the transmission window.

9. The reconfigurable polarization rotator of claim 8, wherein the window reconfiguration commands include parameters selected from the group consisting of: port array size, port pitch, gap spacing between selected ports.

10. A reconfigurable wavelength selective switch, comprising:
   a plurality of N ports for receiving and transmitting optical signals of predetermined wavelengths;
   a switch engine for controlling the connection between input ports and output ports within the plurality of N ports; and
   a reconfigurable port interface disposed between the plurality of N ports and the switch engine, including
      a birefringent walk-off plate disposed adjacent to the plurality of N ports, the birefringent walk-off plate performing spatial separation of orthogonal polarizations of an optical input signal and spatial recombination of parallel polarizations of an optical output signal; and
      a polarization rotator array positioned to intercept optical signals exiting and entering the birefringent walk-off plate, the polarization rotator array including a plurality of LC microcells, each individual LC microcell separately addressable by a control voltage input to provide one of 90° polarization rotation via a first applied voltage, and 0° polarization rotation via a second applied voltage, and a plurality of control electrodes coupled to the plurality of LC microcells in a one-to-one relationship, wherein first selected groups of adjacent LC microcells are held at the first applied voltage to configure a 90° polarization window and second selected groups of adjacent LC microcells are held at the second applied voltage to configure a 0° polarization window, defining a specific port arrangement of the reconfigurable wavelength selectable switch, the number of individual LC microcells forming the first and second groups selected to define a window size for the defined specific port arrangement.

11. The reconfigurable wavelength selectable switch as defined in claim 10, wherein the interface further comprises a window configuration controller coupled to the plurality of control electrodes and responsive to window reconfiguration commands defining a specific port arrangement, the window configuration controller determining the identity of individual LC microcells required to provide either of 90° polarization rotation and 0° polarization rotation for a given arrangement of the plurality of optical signal coupling ports for configuring the specific port arrangement.

12. The reconfigurable wavelength selectable switch as defined in claim 10 wherein the reconfigurable port interface is controlled to define the plurality of N ports as a twin WSS, each WSS having N/2 ports.

13. The reconfigurable wavelength selectable switch as defined in claim 10 wherein the reconfigurable port interface is controlled to define the plurality of N ports as a 1×N WSS, having a single input port and a plurality of (N−1) selectable output ports.

14. The reconfigurable wavelength selectable switch as defined in claim 10 wherein the reconfigurable port interface is controlled to define the plurality of N ports as an N×1 WSS, having a single output port and a plurality of (N−1) selectable input ports.

15. The reconfigurable wavelength selectable switch as defined in claim 10 wherein the reconfigurable port interface is controlled to define the plurality of N ports as a set of four separate wavelength selective switches, each having N/4 ports.

* * * * *